Sept. 26, 1961 J. L. GIOVANNUCCI 3,001,277
PROCESS FOR PATTERN BRAZING METAL SURFACES TOGETHER
Filed Aug. 18, 1955 3 Sheets-Sheet 1
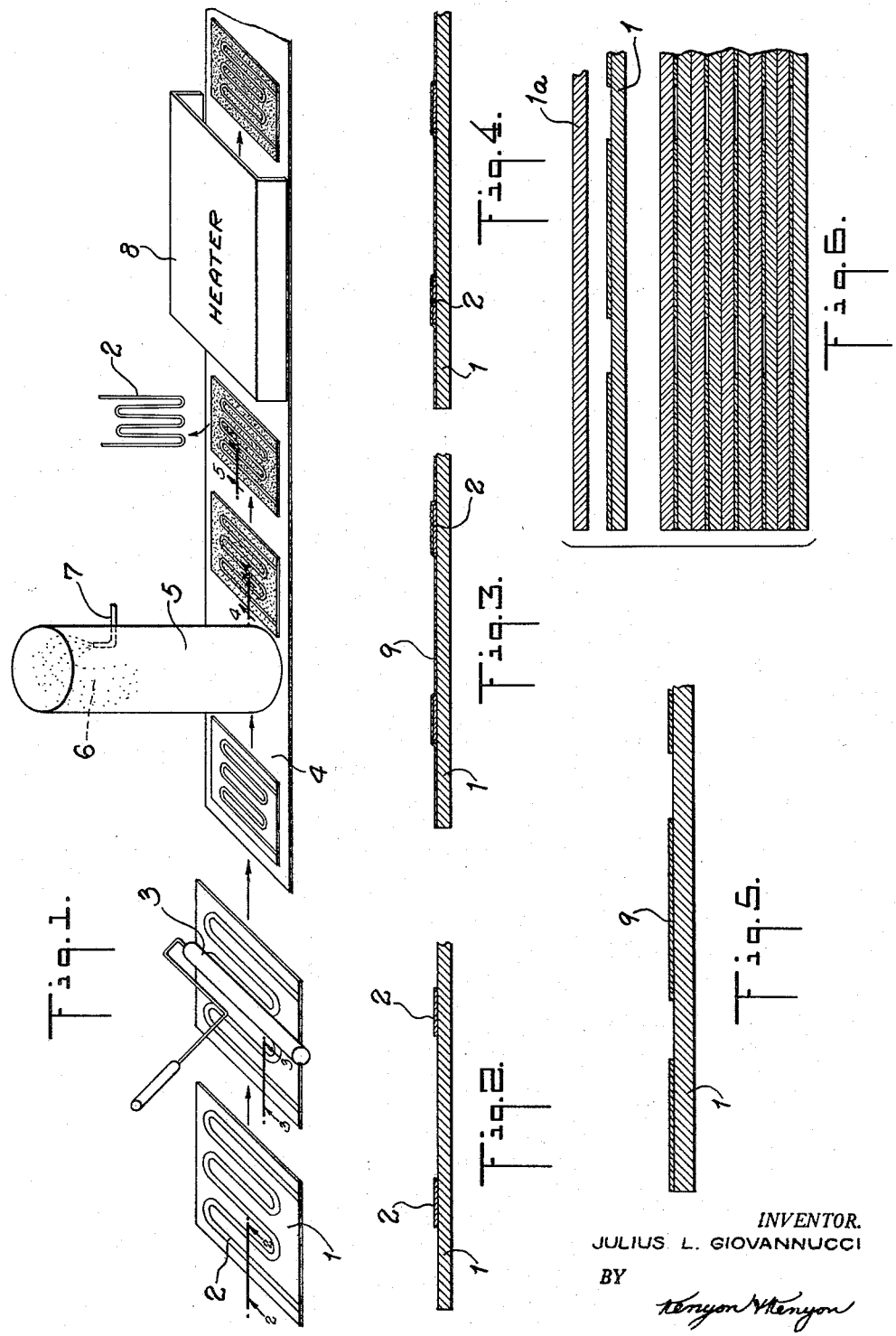
INVENTOR.
JULIUS L. GIOVANNUCCI
BY
Kenyon & Kenyon
ATTORNEYS Sept. 26, 1961    J. L. GIOVANNUCCI    3,001,277
PROCESS FOR PATTERN BRAZING METAL SURFACES TOGETHER
Filed Aug. 18, 1955    3 Sheets-Sheet 2
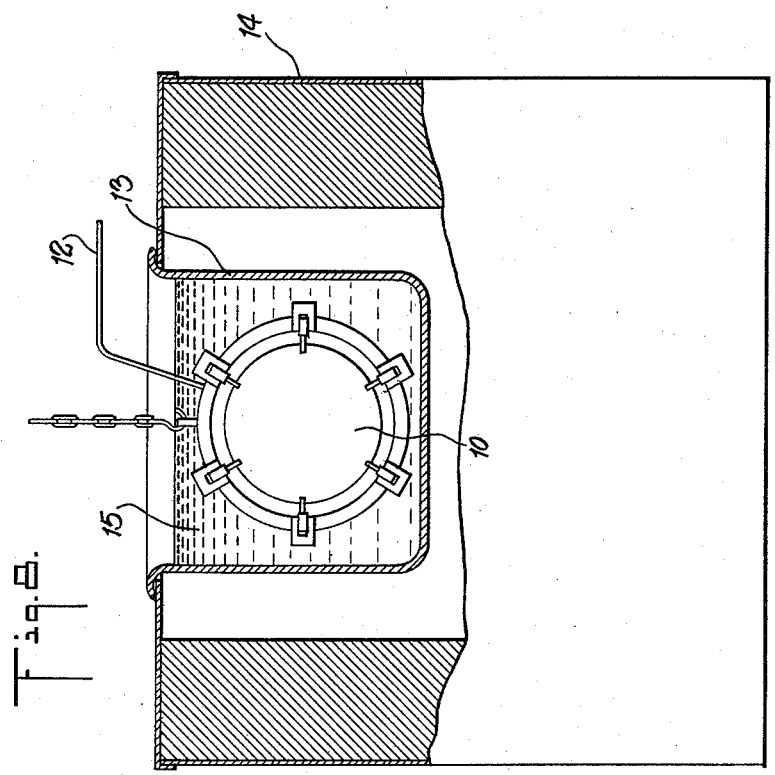
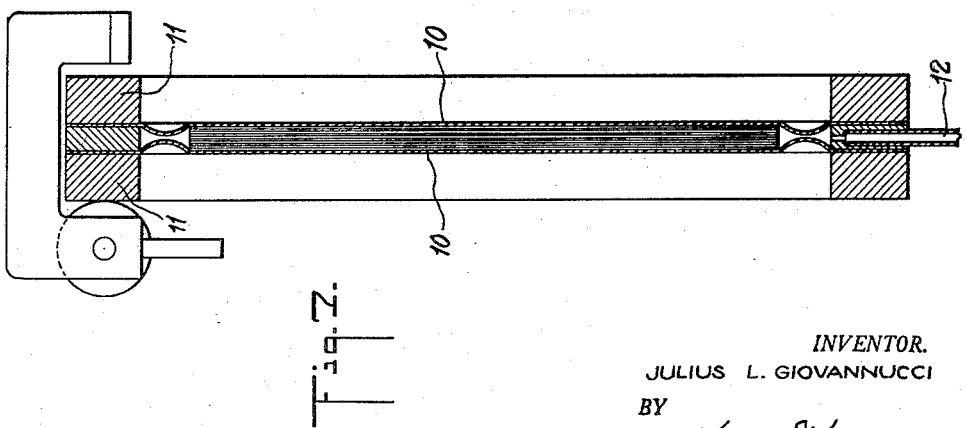
INVENTOR.
JULIUS L. GIOVANNUCCI
BY
Kenyon Kenyon
ATTORNEYS

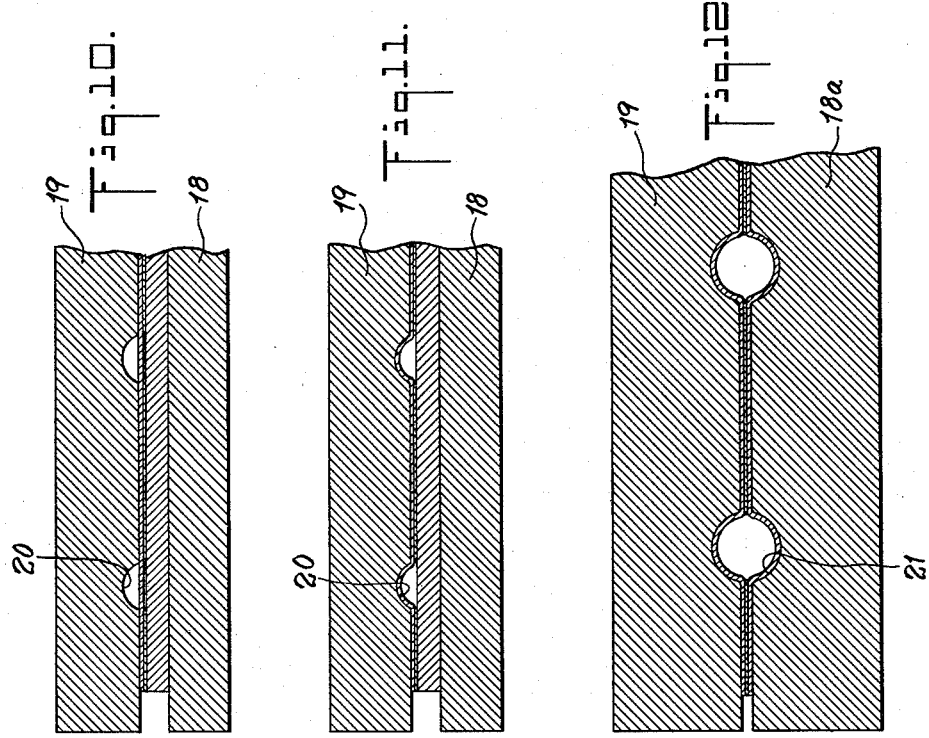
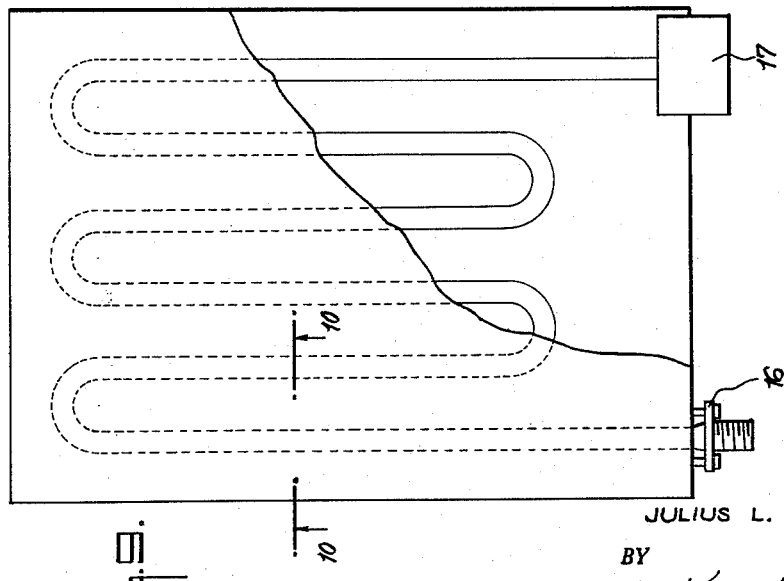

United States Patent Office 3,001,277
Patented Sept. 26, 1961

3,001,277
PROCESS FOR PATTERN BRAZING METAL SURFACES TOGETHER
Julius L. Giovannucci, Stratford, Conn., assignor to Bridgeport Brass Company, Bridgeport, Conn., a corporation of Connecticut
Filed Aug. 18, 1955, Ser. No. 529,224
6 Claims. (Cl. 29—495)

This invention relates to a process for pattern brazing metal surfaces together. The resulting product may, for example, consist of two flat metal layers which are superimposed or laminated with their adjacent surfaces interbrazed throughout certain areas only, thus leaving an unbrazed portion or area. This unbrazed portion or area may take the form of a passageway having any of a great number of possible shapes and into which fluid may be injected under adequate pressure to expand one or both of the laminations or layers throughout the unbrazed portion or area. In this fashion it is possible to produce refrigerator evaporator units, heat exchange devices in general, and other products.

The prior art contains a number of suggestions for producing this general kind of product with the two layers or laminations either welded or brazed together. These suggestions having involved great technical difficulties and, insofar as is known, have not gone into extensive commercial use, if at all, with one possible exception. In the case of this exception, however, the interwelding of the two layers or laminations must be effected by the use of a rolling mill which elongates the layers so much that the pattern printed on one or another of the two interfaces, to provide the pattern or unwelded area or portion, must be contorted so that it comes out right after the elongation resulting from the rolling. This introduces the possibility of error in calculating the pattern which must be printed. Another disadvantage is that the choice of metals, which can be interwelded, is rather limited, and, of course, a metal rolling mill, required by this prior art practice, is expensive to purchase and operate.

One of the objects of the present invention is to provide a process for making pattern brazed products, adapted for subsequent fluid expansion, in a fashion free from the various limitations and disadvantages described above. Another object is to provide a process for pattern brazing metal surfaces together, which is reliable and foolproof, in the commercial sense, and which requires the use of only relatively inexpensive equipment and operating practices. Other objects may be inferred from the following disclosure of a specific example of the new process.

The various steps of this new process are illustrated by the accompanying drawings in which:

FIG. 1 shows a production line setup for producing a pattern of brazing metal on one of the surfaces;
FIG. 2 is a cross section taken on the line 2—2 in FIG. 1;
FIG. 3 is a cross section taken on the line 3—3 in FIG.1;
FIG. 4 is a cross section taken on the line 4—4 in FIG. 1;
FIG. 5 is a cross section taken on the line 5—5 in FIG. 1;
FIG. 6 is a cross section showing the manner in which assemblies of the two laminations or layers may be stacked to permit the simultaneous production of a plurality of pattern brazed products;
FIG. 7 is a cross section showing a fixture used in connection with the brazing of the stacked assemblies;
FIG. 8 is a cross section through a pot, showing a front view of the fixture, of FIG. 7, immersed in liquid in this pot;
FIG. 9 is a partly broken away view showing a finished pattern brazed product ready for fluid expansion;
FIG. 10 is a cross section taken on the line 10—10 in FIG. 9;
FIG. 11 is the same as FIG. 10 excepting that it shows the results of the fluid expansion; and
FIG. 12 is similar to FIG. 11 excepting that it shows one possible modification in the form of the product produced.

Because the final product must be expanded by fluid pressure, at least one of the layers must comprise a metal sheet of thin enough gauge to permit the desired fluid expansion. If expansion of the other layer or lamination is desired this also must be a sheet of thin enough gauge to permit the fluid expansion. The present invention permits the use of practically any metal for either or both layers which might possibly be desirable in work of this character. For example, one layer may be made of copper and the other layer may be a stainless steel layer, or both layers may be either stainless steel or copper, or in some instances plain-carbon steel may be used. The invention permits the use of practically any metals which may be brazed to each other. The problems of welding are not involved.

With the above in mind, FIG. 1 shows one of the layers 1. The pattern or template 2 is laid on this layer 1, the latter being shown in a horizontal position. This pattern 2, which might be called a template also, may be made of almost any material. Ordinarily the template should be removable from the layer 1. In experimental work a pressure-sensitive adhesive coated cellophane has been used, although paper or other material might also be used. In commercial work it is planned to use a metal pattern which is caused to temporarily adhere to the metal layer 1. For example, magnetic metal, such as plain-carbon steel, may be laid on the layer 1 and caused to adhere to the latter magnetically.

Although the pattern may take many shapes, the one illustrated is a plain sinuous form, such as might be used in refrigerating work, with its ends terminating at one of the edges of the layer 1.

The next step is to apply a wet flux to the layer 1 protected by the pattern 2. This flux may be a solution including a volatile liquid which will permit drying by evaporation. The following solution, by weight, has been used satisfactorily.

| | Parts |
|---|---|
| Potassium hydroxide | 1 |
| "Handy flux" | 9 |
| Water | 91 |

The "Handy flux" component, manufactured by Handy and Harman, has the following (dry basis) analysis:

| | Percent |
|---|---|
| Potassium flouride | 40 |
| Boric acid | 30 |
| Sodium borate | 30 |

This wet flux solution is uniformly applied to the layer 1, as by means of an absorbent roller 3 wet with the wet flux. The flux should be applied uniformly with the pattern 2 protecting the covered portions of the layer 1 from being wet by the flux.

In accordance with good brazing practice, the layer 1 is, of course, cleaned prior to the brazing. This cleaning may be conducted in any manner providing a good surface which is chemically clean to a reasonable degree. The layer 1 is dry prior to the application of the wet flux.

This layer 1, now carrying the pattern 2 and wet by the flux on its surface carrying this pattern, is next laid, pattern side upwardly, on a horizontal conveyor 4, for example. This carries the layer through the next step which comprises the act of halting the layer beneath a tower 5 up in which a shower of brazing metal 6 is blown by compressed air through a pipe 7. Although other means might be used, this method of applying the flux powder has proven to be efficient under commercial operating conditions. The brazing powder should be of adequately small particle size to fall uniformly. 300 mesh and 150 mesh particles sizes have been used successfully.

The physical properties of the wet flux coating layer, on the metal layer 1, should be such as to anchor the particles of brazing powder which fall uniformly on the metal layer. The viscosity and thickness of the flux coating should be adjusted so that there is no tendency for the brazing metal particles to wash about if the metal layer is tipped slightly or moved while in its horizontal position.

Both the thickness of the flux coating and its composition and the density with which the brazing particles are distributed should be adjusted so that after the layers are brazed together the bond between the layers is in the form of a flux slag which forms a highly dispersed phase mingled with a matrix of the brazing metal. Relatively little brazing metal is required and its use should be limited preferably to the minimum required to effect an adequate bond. The brazing metal used may be a low-temperature brazing alloy, of the particle size previously mentioned, an example being the following:

| | Percent |
|---|---|
| Silver | 50 |
| Copper | 15.5 |
| Zinc | 16.5 |
| Cadmium | 18 |

Other brazing alloys may be used depending on the nature of each of the metal layers. For example, if one or both of the layers are copper it may be desirable to keep to a relatively low brazing temperature, depending on the desired finish or appearance of the final product and other factors.

In many instances, when practicing the present invention, the exact natures of the flux and brazing powder are generally immaterial providing an effective bond is obtained in the final product.

In any event, the pattern 2, of course, also prevents the brazing powder from reaching the protected portion or area of the surface of the metal layer 1. Therefore, this pattern may be removed to leave a printed pattern of the flux and the brazing powder. The next step is to dry the wet flux as by passing it beneath a radiant heater 8, the layer 1 still being carried by the conveyor 4. The pattern 2 may be removed either before or after this drying. The removal of the pattern should be at a time which best assures a sharply defined printing effect.

In FIG. 2 the pattern is shown applied. FIG. 3 shows the flux 9 coating applied over both the upper surface of the layer 1 and the protecting pattern 2, FIG. 4 representing the addition of the brazing powder, which cannot be illustrated. Finally, FIG. 5 shows the appearance of the metal layer after the pattern 2 is removed.

When both layers of the desired product are thin enough to be flexible, under the application of fluid pressure, a plurality of assemblies, formed from the layers, may be stacked. This is generally shown by FIG. 6, each layer 1 having its mating layer 1a superimposed thereon to form an assembly and a plurality of the assemblies being stacked.

The next step is to apply brazing heat and pressure to the two layers of each assembly. When the layers are relatively thin and stacked they may be placed in a fixture such as is shown by FIG. 7. Here the stack of assemblies is enclosed on both sides by two flexible diaphragms 10 peripherally clamped air-tightly by an annulus assembly 11 which is provided with an exhaust tube 12 through which the atmosphere may be sucked between the two diaphragms 10 when the tube is connected to a vacuum source. This causes these diaphragms 10 to press the stack tightly together with all of the various interfacing surfaces flexing into conformity with each other. In case the layers are thicker it may be necessary to resort to other pressure applying means.

The above described fixture is made throughout of metal so that it may be lowered into a pot 13 mounted in a furnace 14 and filled with a molten salt 15 at brazing temperature. This permits the fixture to be brought quickly to interbrazing temperature while the vacuum is maintained by keeping the tube 12 connected to a vacuum source. As soon as the brazing metal reaches brazing temperature the fixture may be removed from the molten salt bath 15 and, if desired, either cooled naturally or forceably by use of a suitable liquid quench.

It is to be noted that no heavy or expensive equipment has been used to produce this pattern brazed product. The unbrazed areas are clean and free from any contamination.

In FIG. 9 the pattern brazed product, produced by the present invention, is shown as having a wedge-shaped nozzle 16 hammered into one of the unbrazed ends of the area that was occupied by the pattern 2. By connecting this nozzle 16 with a source of fluid under pressure the unbrazed pattern may be expanded. This area is shown as a passage and it is ordinarily desirable to apply a clamp 17 to the other end of the passage to permit the development of proper pressure for expansion.

In some instances dies may be used to advantage, this being shown by FIG. 10 wherein the lower die 18 is flat and the upper die 19 has a groove 20 following the contour of the unbrazed area of the product. FIG. 11 shows how the use of the expanding fluid produces a passage having a predetermined cross sectional contour. If expansion of both layers of the brazed product is desired then the die 18 should be substituted by a die 18a having a groove 21 registering with the groove 20. Then, as shown by FIG. 12, the expanding fluid expands both layers.

Summarizing the foregoing, the pattern, acting as a shield, keeps the pre-selected areas free from the wet flux and from the brazing powder with which the fluxed surface is dusted. Drying of the wet flux and removal of the pattern shield leaves a printed or stenciled pattern of brazing powder. When this and the other surface are placed together to form an assembly, and the flexible layer or layers of this assembly are flexed to make the surfaces conform, the brazing heat provides sharply defined brazed areas. The vacuum fixture and salt pot are both inexpensive units. The resulting product may be expanded by fluid pressure.

The base metal may be of any thickness, thus permitting the making of parts having great wall thickness with the pattern expanded layer providing for heating or cooling of either the wall itself or material in contact with the wall. Milk coolers, degreasers, milk pasteurizing equipment and other heavy-walled devices may be provided with heat exchanging means in this manner.

Any means for applying the flux may be used, the roller described being illustrative. Although the brazing material is absent from the portions protected by the pattern, under some conditions these portions may tend to stick together, but this can be prevented in various ways, as by lightly coating with a separating medium, for example.

I claim:

1. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux, superimposing the two surfaces, the pattern shield being removed from said surface after said dusting and prior to said superimposing, and applying brazing heat and pressure to the superimposed surfaces to braze them together excepting for the area that was protected by the pattern shield.

2. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux, superimposing the two surfaces, the pattern shield being removed from said surface after said dusting and prior to said superimposing, and applying brazing heat and pressure to the superimposed surfaces to braze them together excepting for the area that was protected by the pattern shield, one of the surfaces being formed by a flexible layer that may be flexed to force this surface to conform with the other surface, and said pressure being applied by positioning a flexible diaphragm so that one of its sides may press towards the side of said flexible layer opposite to said surfaces, applying a greater fluid pressure to said side of the diaphragm and, by comparison, a lesser fluid pressure to its other side so that the diaphragm flexes, under the resulting pressure differential, and flexes said flexible layer to force its said surface to conform with the other surface while the brazing heat is applied, and thereafter cooling said surfaces while maintaining said pressure differential.

3. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux, superimposing the two surfaces, the pattern shield being removed from said surface after said dusting and prior to said superimposing, and applying brazing heat and pressure to the superimposed surfaces to braze them together excepting for the area that was protected by the pattern shield, one of the surfaces being formed by a flexible layer that may be flexed to force this surface to conform with the other surface, and said pressure being applied by positioning a flexible diaphragm so that one of its sides may press towards the side of said flexible layer opposite to said surfaces, applying a greater fluid pressure to said side of the diaphragm and, by comparison, a lesser fluid pressure to its other side so that the diaphragm flexes, under the resulting pressure differential, and flexes said flexible layer to force its said surface to conform with the other surface while the brazing heat is applied, and thereafter cooling said surfaces while maintaining said pressure differential, said brazing heat being applied by submerging the diaphragm's said other, and outer, side in a liquid heated to the brazing temperature.

4. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux superimposing the two surfaces, the pattern shield being removed from said surface after said dusting and prior to said superimposing, and applying brazing heat and pressure to the superimposed surfaces to braze them together excepting for the area that was protected by the pattern shield, one of the surfaces being formed by a flexible layer that may be flexed to force this surface to conform with the other surface, and said pressure being applied by positioning a flexible diaphragm so that one of its sides may press towards the side of said flexible layer opposite to said surfaces, applying a greater fluid pressure to said side of the diaphragm and, by comparison, a lesser fluid pressure to its other side so that the diaphragm flexes, under the resulting pressure differential, and flexes said flexible layer to force its said surface to conform with the other surface while the brazing heat is applied, and thereafter cooling said surfaces while maintaining said pressure differential, said brazing heat being applied by submerging the diaphragm's said other, and outer, side in a liquid heated to the brazing temperature, said cooling being effected by submerging the diaphragm's said other, and outer, side in a liquid quench.

5. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux, superimposing the two surfaces, the pattern shield being removed from said surface after said dusting and prior to said superimposing, and applying brazing heat and pressure to the superimposed surfaces to braze them together excepting for the area that was protected by the pattern shield, the surfaces being formed by metal layers of which one may be flexed by atmospheric pressure to force its one of the surfaces to conform with the other and these layers forming an assembly when their surfaces are superimposed, said brazing heat and pressure being applied by enclosing said assembly in a casing providing a flexible diaphragm located so that the inner one of its sides can apply pressure to the flexible layer's side opposite to the superimposed surfaces, supporting the other of said layers in said casing and evacuating said casing so that the atmospheric pressure forces the surfaces to conform with each other by flexing of the diaphragm and flexible layer, and, while the casing is evacuated immersing the casing in a liquid heated to brazing temperature.

6. A process for pattern brazing metal surfaces together, said process including positioning a pattern shield on one of the surfaces, applying a wet flux to said surface to wet it excepting where protected by the pattern shield, dusting said surface with powdered brazing metal while wet with the flux so that this metal adheres thereto, drying the wet flux, superimposing the two surfaces, the pattern shield being removed from said surface after said dusting and prior to said superimposing, and applying brazing heat and pressure to the superimposed surfaces to braze them together excepting for the area that was protected by the pattern shield, said pattern shield having a portion extending to one of the limits of said surfaces and one of the latter being formed by a ductile metal layer thin enough to be drawn outwardly by the introduction of fluid pressure to said unbrazed area.

References Cited in the file of this patent

UNITED STATES PATENTS

| | | |
|---|---|---|
| 684,670 | Boehmler | Oct. 15, 1901 |
| 841,151 | Hornsby | Jan. 15, 1907 |
| 2,154,273 | Kollsman | Apr. 11, 1939 |
| 2,210,314 | Wright | Aug. 6, 1940 |
| 2,333,343 | Sendzimir | Nov. 2, 1943 |
| 2,466,890 | Gilbertson | Apr. 12, 1949 |
| 2,570,121 | Harbaugh | Oct. 2, 1951 |
| 2,662,273 | Long | Dec. 15, 1953 |
| 2,713,196 | Brown | July 19, 1955 |
| 2,754,784 | Maysmor et al. | July 17, 1956 |
| 2,779,086 | Rieppel et al. | Jan. 29, 1957 |
| 2,816,355 | Herman | Dec. 17, 1957 |
| 2,845,698 | Giovannucci et al. | Aug. 5, 1958 |